(12) United States Patent
Lin et al.

(10) Patent No.: US 10,559,279 B2
(45) Date of Patent: Feb. 11, 2020

(54) WIRELESS HEAD-MOUNTED DEVICE

(71) Applicant: HEWLETT-PACKARD DEVELOPMENT COMPANY, L.P., Houston, TX (US)

(72) Inventors: I-Chen Lin, Taipei (TW); Han-Kuang Chang, Taipei (TW); Chung-Chun Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/325,300

(22) PCT Filed: Oct. 21, 2016

(86) PCT No.: PCT/US2016/058268
§ 371 (c)(1),
(2) Date: Feb. 13, 2019

(87) PCT Pub. No.: WO2018/075076
PCT Pub. Date: Apr. 26, 2018

(65) Prior Publication Data
US 2019/0237040 A1     Aug. 1, 2019

(51) Int. Cl.
*H04B 1/40* (2015.01)
*H04B 1/3827* (2015.01)
(Continued)

(52) U.S. Cl.
CPC .......... *G09G 5/006* (2013.01); *H04B 1/0343* (2013.01); *H04B 1/086* (2013.01); *G09G 2370/16* (2013.01)

(58) Field of Classification Search
CPC ............ G02B 27/01; H04B 1/40; H04B 7/00; H04W 28/02
See application file for complete search history.

(56) References Cited

U.S. PATENT DOCUMENTS 8,326,221 B2 * 12/2012 Dorsey .................. G06Q 10/02
455/41.1
8,736,516 B2    5/2014 Jacobsen et al.
(Continued)

FOREIGN PATENT DOCUMENTS

WO    WO-2015081029 A1    6/2015
WO    WO-2016055317 A1    4/2016

OTHER PUBLICATIONS

WiDi and WiGig to bring untethered Oculus Rift CV1?, Oct. 1, 2014. <https://www.reddit.com/r/oculus/comments/2hz996/widi_and_wigig_to_bring_untethered_oculus_rift_cv1/ >.

*Primary Examiner* — Blane J Jackson
(74) *Attorney, Agent, or Firm* — Brooks, Cameron & Huebsch PLLC (57) ABSTRACT

Example systems relate to wireless head-mounted devices. A wireless head-mounted device may include high-throughput performance miming at millimeter wave band receiving hardware to receive a transmission from corresponding high-powered transmitting hardware included in a computing device. The transmission may include audio, visual, or video data. The wireless head-mounted device may further include a plurality of sensors to collect sensor data. The wireless head-mounted device may further include low-powered transmitting hardware to transmit at least the sensor data collected by the sensors to corresponding low-powered receiving software included in the computing device.

14 Claims, 4 Drawing Sheets

(51) Int. Cl.
  *G02B 27/01* (2006.01)
  *G09G 5/00* (2006.01)
  *H04B 1/034* (2006.01)
  *H04B 1/08* (2006.01)

(56) References Cited

U.S. PATENT DOCUMENTS

| | | |
|---|---|---|
| 2008/0024594 A1 | 1/2008 | Ritchey |
| 2013/0173315 A1 | 7/2013 | Dorsey |
| 2014/0086125 A1 | 3/2014 | Polo et al. |
| 2015/0325202 A1 | 11/2015 | Lake et al. |
| 2016/0150591 A1 | 5/2016 | Tarighat Mehrabani et al. |
| 2016/0162012 A1* | 6/2016 | Chang .................. G06F 3/011 345/211 |
| 2016/0163221 A1 | 6/2016 | Sommer et al. |
| 2017/0227765 A1* | 8/2017 | Mammou ............ G02B 27/017 |
| 2018/0062248 A1* | 3/2018 | Psychoudakis ........ H01Q 1/273 |
| 2018/0081425 A1* | 3/2018 | Briggs ................ H04B 10/116 |

\* cited by examiner

WIRELESS HEAD-MOUNTED DEVICE

BACKGROUND

Head-mounted devices may include virtual reality or augmented reality devices. The head-mounted device may be connected to a computing device by a cable. The computing device may run a program to generate a reality, in the case of virtual reality, or to enhance reality, in the case of augmented reality. The reality created by the program may be transmitted via the cable to the head-mounted device, allowing a wearer of the head-mounted device is able to experience and interact with the reality.

DETAILED DESCRIPTION

Head-mounted devices may connect to computing devices capable of executing, e.g., running, programs to generate a reality, in the case of a virtual reality (VR), or to enhance reality in the case of augmented reality (AR). As used herein, a head-mounted device refers to a device worn on the head which may display audio and/or visual data to the wearer. The head-mounted device may include sensors that may allow a wearer of the head-mounted device to experience a computer-generated reality in connection with a program, e.g., machine readable instructions, executing on another computing device. The reality may be manipulated and explored using various devices, such as head-mounted devices or sensors. In this manner, a head-mounted device may allow a wearer to experience a live direct or indirect view of a physical, real-world environment whose elements are augmented, or supplemented, by computer-generated sensory input such as sound, video, graphics and/or location data, e.g., GPS data.

Head-mounted devices may use input from a computer program to allow a wearer to experience a VR and/or an AR reality. In some examples, the head-mounted device may be connected to a computing device executing the VR and/or AR program by a cable. The cable may allow data to be exchanged between the computing device and the head-mounted device. The wearer may then experience and interact with the reality of the program running on another computing device through the data exchange with the head-mounted device.

When a wearer interacts with a program running on a computing device through a head-mounted device, data may be collected by the head-mounted device. For example, a wearer of the head-mounted device may perceive movement within the program or may perceive interaction with objects acoustically and/or visually produced by the program. The head-mounted device, through sensors in the head-mounted device, may detect a wearer's physical movement, e.g., eye, head, arm, spatial movement, etc., and receive, record and/or transmit such information as data to the computing device via the cable. The data may be operated upon by the executing program on the computing device and updated information in the form of data may be transmitted back from the executing program on the computing device to head-mounted device. In some examples, the above described data may be transmitted from the executing program on the computing device to the head-mounted device simultaneously with data being transmitted from the head-mounted device and received by the executing program on the computing device.

Having a cable connection between a head-mounted device and a computing device may pose issues. For example, the cable may be a safety issue. A wearer who is using a head-mounted device may not be aware of the location of the cable. This can lead to accidents caused by, for example, tripping over the cable. Additionally, using a cable may limit how far a wearer is able to travel from the computer. The cable may have a defined length, meaning that a wearer is tethered to the computer and cannot move beyond the length of the cable. This may impede freedom of movement within the reality of the program.

VR and AR devices may also communicate with the computer program using wireless technology. For example, a VR or AR device may include a transceiver that is able to both receive data from the program and transmit data back to the computer hosting the program. In some examples, the transceiver may operate using IEEE 802.11x, or Wi-Fi. In other examples, the transceiver may operate using Bluetooth. Additionally, the VR or AR device may include both a Wi-Fi and a Bluetooth transceiver.

However, when using wireless technology with a VR or AR device, safety and health concerns may arrive. For example, the Federal Communications Commission (FCC) has issued regulations for radio frequency (RF) exposure. These regulations are intended to limit the amount of RF exposure a device user receives. Using both Wi-Fi and Bluetooth to transmit and receive data from a VR or AR program may cause a device to fall outside the recommended RF exposure limits. While the RF exposure could be lessened, this may be done at the expense of the quality of the audio and visual data received.

Figure 1:
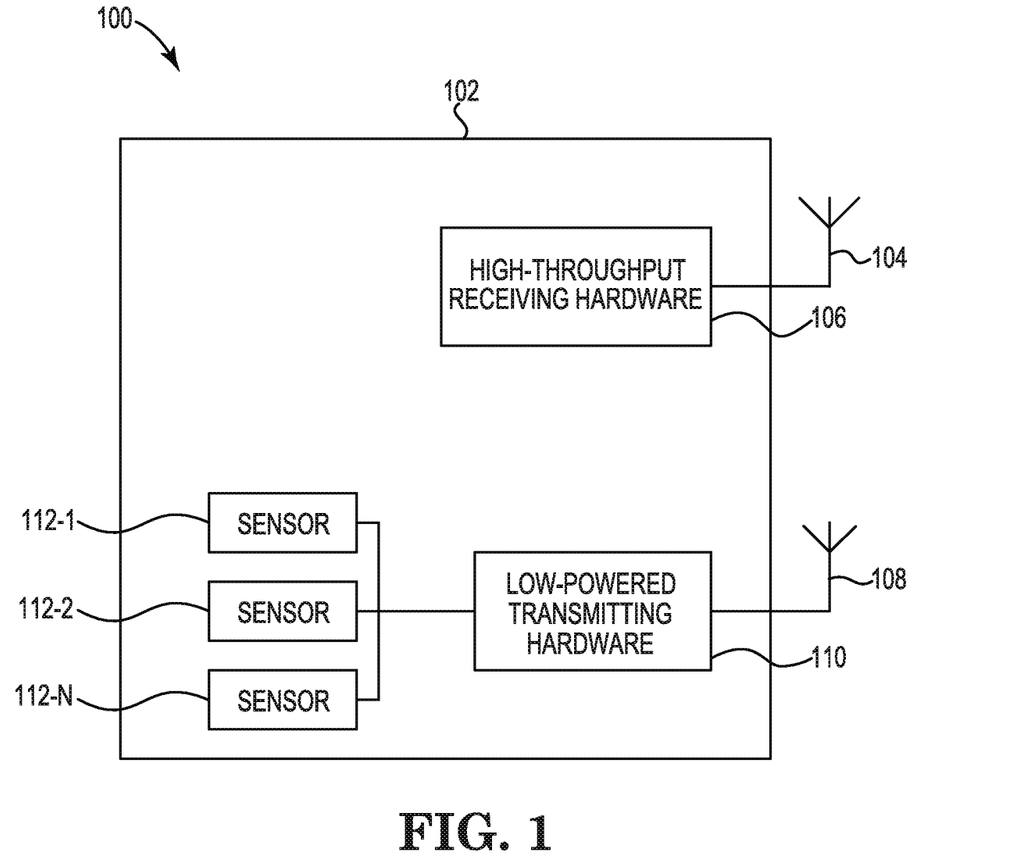
FIG. 1 illustrates an example of a wireless head-mounted device according to the disclosure.

FIG. 1 is an example of a wireless head-mounted device 100 for a wireless head-mounted device according to the present disclosure. As shown in FIG. 1, the example wireless head-mounted device 100 may include multiple components. For example, wireless head-mounted device 100 may be a head-mounted device 102. Head-mounted device 102 may be a virtual reality or an augmented reality device. In some examples, head-mounted device 102 may display visual data to the wearer on a screen. In some examples, head-mounted device 102 may include a plurality of audio speakers to display audio data to the wearer.

Head-mounted device 102 may include a wireless antenna 104 coupled to high-throughput performance receiving hardware 106. As used herein, a wireless antenna refers to hardware that is able to receive and/or send a data transmission. As used herein, high-throughput performance receiving hardware refers to hardware to receive a data transmission. High-throughput performance receiving hardware 106 may receive data at a rate equal to or greater than one gigabit per second. In some examples, high-throughput performance receiving hardware 106 may run on a millimeter wave band. In some examples, the millimeter wave band may correspond to Wireless Gigabit Alliance (WiGig) protocols. In some examples, the millimeter wave band may correspond to an IEEE 802.11ad connection. In some examples, the millimeter wave band may correspond to an IEEE 802.11ay connection. In some examples, the received data transmission may include audio, video, and/or visual data, or a combination thereof.

Head-mounted device 102 may include a wireless antenna 108 coupled to lower-powered transmitting hardware 110. As used herein, low-powered transmitting hardware refers to hardware to send a data transmission. Low-powered transmitting hardware 110 may transmit data at a rate equal to or below five megabits per second. In some examples, low-powered transmitting hardware 110 may transmit data via a Bluetooth connection.

Head-mounted device 102 may further include a plurality of sensors 112-1, 112-2 . . . 112-N (collectively referred to herein as sensors 112). As used herein, a sensor refers to hardware to monitor responses and collect data. In some examples, sensors 112 may include gyroscopes, electromagnetic tracking systems, acoustic tracking systems, optical tracking systems, and mechanical tracking systems. Sensors 112 may collect data corresponding to movement, responses to the audio and/or visual data transmitted by wireless antenna 104, or a combination thereof.

In some examples, a plurality of sensors 112 may be located outside the head-mounted device. For example, a mechanical tracking system may be located in a joystick held by the wearer of the head-mounted device. In such examples, when the wearer moves his arms and hands, the joystick may determine that movement has occurred. For example, a wearer may raise his arms, prompting the tracking system within the joystick to determine that the wearer has raised his arms. In such examples, the sensors 112 located outside the head-mounted device may be wirelessly connected via, for example, a Bluetooth connection, to the head-mounted device.

Once sensors 112 have collected data, sensors 112 may send the data to low-powered transmitting hardware 110. Low-powered transmitting hardware 110 may then allow wireless antenna 108 to transmit the data to a receiver (not shown in FIG. 1).

Figure 2:
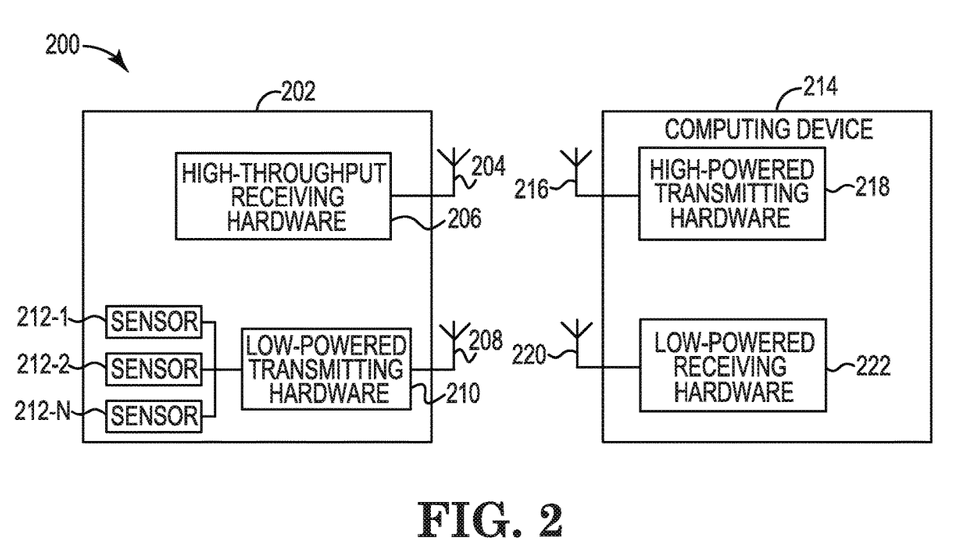
FIG. 2 illustrates an example of a system including a wireless head-mounted device according to the disclosure.

FIG. 2 is an example of a system 200 including a wireless head-mounted device according to the present disclosure. System 200 may include a head-mounted device 202. Head-mounted device 202 may correspond to head-mounted device 102, shown in FIG. 1. System 200 may further include a wireless antenna 204 coupled to high-throughput performance receiving hardware 206. Wireless antenna 204 may correspond to wireless antenna 104 and high-throughput performance receiving hardware 206 may correspond to high-throughput performance receiving hardware 106, both shown in FIG. 1.

System 200 may include a wireless antenna 208 coupled to a low powered-transmitting hardware 210. Wireless antenna 208 and low-powered transmitting hardware 210 may correspond to wireless antenna 108 and low-powered transmitting hardware 110, both shown in FIG. 1. System 200 may include a plurality of sensors 212-1, 212-2 . . . 212-N (collectively referred to herein as sensors 212). Sensors 212 may correspond to sensors 112, shown in FIG. 1.

System 200 may further include a computing device 214. As used herein, a computing device refers an electronic device which operates using an operating system that is loaded onto the electronic device. Computing device 214 may be a personal computer, a notebook computer, a tablet computer, a mobile phone, or a smart device (e.g., a smartwatch).

Computing device 214 may include a wireless antenna 216 coupled to high-powered transmitting hardware 218. As used herein, high-powered transmitting hardware refers to hardware to transmit data. High-powered transmitting hardware 218 may transmit data at a rate equal to or greater than one gigabit per second. In some examples, high-powered transmitting hardware 218 may transmit data via a transmission operating on a millimeter wave band connection. In some examples, the data transmitted may include audio, visual, and/or visual data, or any combination thereof.

Wireless antenna 216 may transmit data by the high-powered transmitting hardware 218 to wireless antenna 204. As previously discussed, wireless antenna 204 may be coupled to high-throughput performance receiving hardware 206. High-throughput performance receiving hardware 206 may be complementary to high-powered transmitting hardware 218. Said differently, high-throughput performance receiving hardware 206 may be configured to receive data transmissions at wireless antenna 204 that are sent by high-powered transmitting hardware 218 using wireless antenna 216.

Computing device 214 may include a wireless antenna 220 coupled to low-powered receiving hardware 222. As used herein, low-powered receiving software refers to machine-readable instructions to receive a data transmission. In some examples, low-powered receiving hardware 222 may receive data at a rate equal to or below 5 megabits per second. In some examples, low-powered receiving hardware 222 may receive data via a Bluetooth connection.

Low-powered receiving hardware 222 may receive data via wireless antenna 220. In some examples, low-powered receiving hardware 222 may receive data sent by low-powered transmitting hardware 210 using wireless antenna 208. Low-powered receiving hardware 222 may receive data including data collected from sensors 212. In some examples, sensors 212 may collect data; the collected data may then be transmitted using the low-powered transmitting hardware 210 and wireless antenna 208 to low-powered receiving hardware 222 via wireless antenna 220.

As shown in FIG. 2, computing device 214 includes a wireless antenna 216 coupled to high-powered transmitting hardware 218. Wireless antenna 216 and high-powered transmitting hardware 218 may correspond to wireless antenna 204 and high-throughput performance receiving hardware 206, located on head-mounted device 202. High-throughput performance receiving hardware 206 may be unable to transmit data. In other words, head-mounted device 202 may contain high-throughput performance receiving hardware 206 coupled to a wireless antenna 204 but may not contain high-powered transmitting hardware. Computing device 214 may contain high-powered transmitting hardware 218 coupled to a wireless antenna 216 but may not contain high-throughput performance receiving hardware. In other words, system 200 may be able to use high-powered transmissions transmit data one way, from computing device 214 to head-mounted device 202. System 200 may be unable to use high-powered transmissions to transmit data from head-mounted device 202 to computing device 214.

As shown in FIG. 2, computing device 214 includes a wireless antenna 220 coupled to low-powered receiving hardware 222. Wireless antenna 220 and low-powered receiving hardware 222 may correspond to wireless antenna 208 and low-powered transmitting hardware 210, located on head-mounted device 202. Low-powered receiving hardware 210 may be unable to receive data. In other words, head-mounted device 202 may contain low-powered transmitting hardware 210 coupled to a wireless antenna 208 but may not contain low-powered receiving hardware. Computing device 214 may contain low-powered receiving hardware 222 coupled to a wireless antenna 220 but may not contain low-powered transmitting hardware. In other words, system 200 may be able to use low-powered transmissions transmit data one way, from head-mounted device 202 to computing device 214. System 200 may be unable to use high-powered transmissions to transmit data from computing device 214 to head-mounted device 202.

Figure 3:
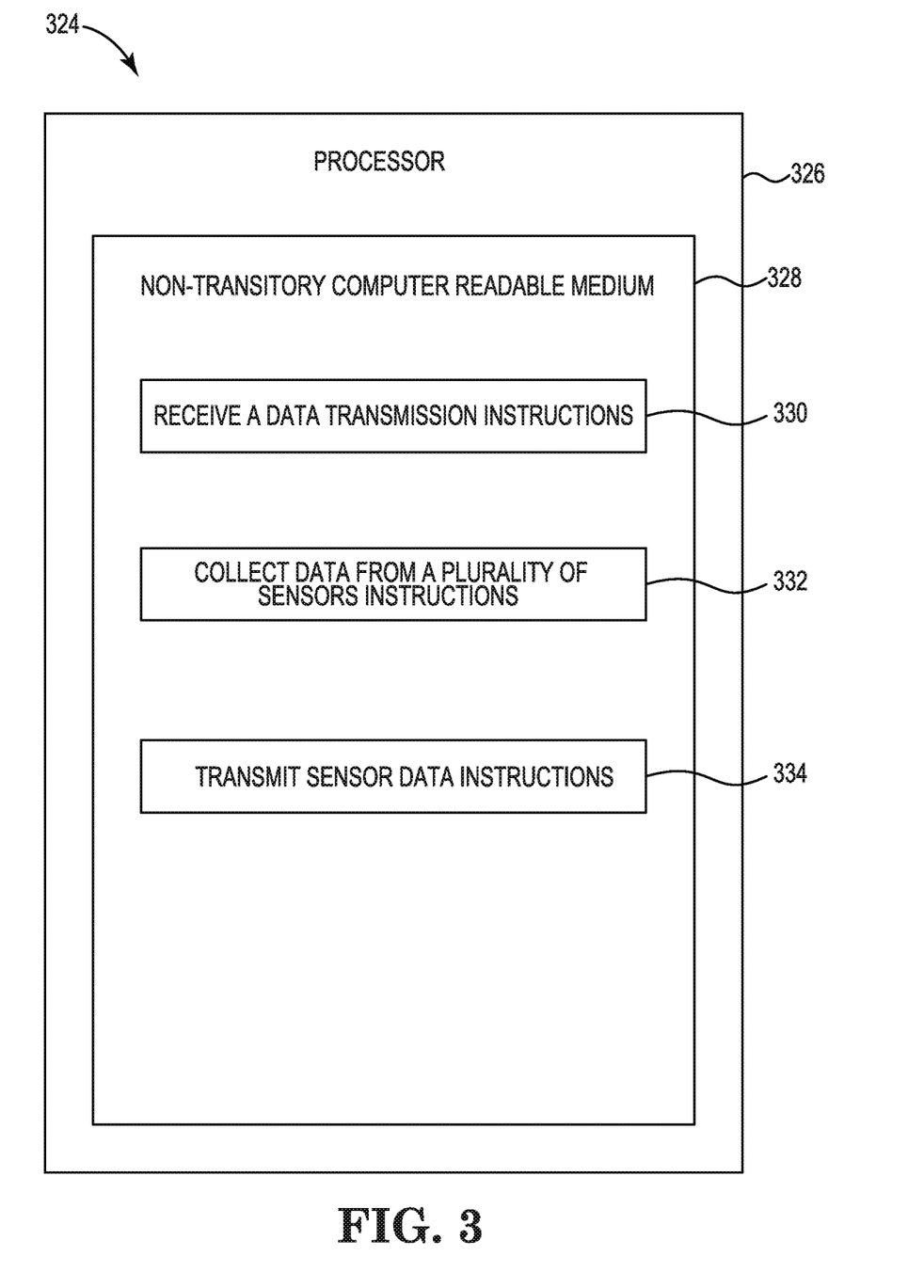
FIG. 3 illustrates an example of a system for a wireless head-mounted device according to the disclosure.

FIG. 3 is an example of a system 324 for a wireless head-mounted device according to the present disclosure. As shown in FIG. 3, system 324 may include multiple components. For example, system 324 may include a processor 326 and a non-transitory computer-readable storage medium 328. Although the following descriptions refer to a single processor and a single computer readable storage medium, the descriptions may also apply to a system with multiple processors and multiple computer readable storage mediums. In such examples, the instructions may be distributed (e.g., stored) across multiple computer readable storage mediums and the instructions may be distributed (e.g., executed by) across multiple processors.

Processor 326 may be a central processing unit (CPU), a semiconductor based microprocessor, and/or other hardware devices suitable for retrieval and execution of instructions stored in computer-readable storage medium 328. Processor 326 may fetch, decode, and execute instructions 330, 332, 334, or a combination thereof. As an alternative or in addition to retrieving and executing instructions, processor 326 may include at least one electronic circuit that includes electronic components for performing the functionality of instructions 330, 332, 334, or a combination thereof.

Computer readable storage medium 328 may be any electronic, magnetic, optical, or other physical storage device that stores executable instructions. Thus, computer readable storage medium 328 may be, for example, Random Access Memory (RAM), an Electrically-Erasable Programmable Read-Only Memory (EEPROM), a storage drive, an optical disc, and the like. Computer readable storage medium 328 may be disposed within system 324, as shown in FIG. 3. In this situation, the executable instructions may be "installed" on the system 324. Additionally and/or alternatively, computer readable storage medium 328 may be a portable, external or remote storage medium, for example, that allows system 324 to download the instructions from the portable/external/remote storage medium. In this situation, the executable instructions may be part of an "installation package". As described herein, computer readable storage medium 324 may be encoded with executable instructions for a wireless head-mounted device.

Receive a data transmission instructions 330, when executed by a processor such as processor 326, may cause the processor to receive a data transmission. In some examples, the data transmission may be received by high-throughput performance receiving hardware, such as high-powered receiving hardware 106 or 206, as shown in FIGS. 1 and 2, respectively. In some examples, the data transmission may be received via a millimeter wave band connection.

Collect data from a plurality of sensors instructions 332, when executed by a processor such as processor 326, may cause the processor to collect data from a plurality of sensors. The plurality of sensors may correspond to sensors 112 and 212, shown in FIGS. 1 and 2, respectively. As previously discussed, the plurality of sensors may be a variety of types of sensors and may collect multiple kinds of data, including location data and movement data. Collect data from a plurality of sensors instructions 332 may cause a processor such as processor 326 to collect multiple types of data corresponding to the types of sensors present.

Transmit sensor data instructions 334, when executed by a processor such as processor 326, may cause the processor to transmit the sensor data collected at 332. In some examples, the sensor data may be transmitted by low-powered transmitting hardware, such as low-powered transmitting hardware 110 and 210, shown in FIGS. 1 and 2, respectively.

System 324 may further include instructions that, when executed by a processor such as processor 326, may cause processor to combine the data collected from the plurality of sensors at 332 into a single data transmission. In some examples combining the data collected from the plurality of sensors may include grouping like types of data together. For example, if multiple sensors have collected data corresponding to the movement of the head-mounted device's wearer, combine data instructions may group all of the movement data together. Combine data instructions may then combine the data. In some examples, the data may be combined by compressing each set of data (i.e. each set of data corresponding to a particular sensor). In some examples, the data may be combined to form a single transmission. In other words, combine data instructions may be combined so that the collected sensor data can be sent at one time.

Once the data is combined, system 324 may include instructions to transmit the combined data in a single transmission. The single transmission may be transmitted by low-powered transmitting hardware, such as low-powered transmitting hardware 110 and 210, shown in FIGS. 1 and 2, respectively. In some examples, the single data transmission may be sent via a Bluetooth connection.

System 324 may further include instructions that, when executed by a processor such as processor 326, may cause the processor to suppress the millimeter wave band connection when transmitting via the Bluetooth connection. In some examples, the suppress millimeter wave band connection instructions may determine that sensor data has been collected and combined into a single transmission. The millimeter wave band connection suppression instructions may then cause the processor to suppress the millimeter wave band connection. Once the millimeter wave band connection is suppressed, the data transmission may be sent using the Bluetooth connection. In some examples, the data may be transmitted using low-powered transmitting hardware 110 or 210, via wireless antenna 108 or 208, shown in FIGS. 1 and 2, respectively.

System 324 may further include instructions that, when executed by a processor such as processor 326, may cause the processor to enable the millimeter wave band connection when receiving a data transmission. In some examples, the enable millimeter wave band connection instructions may determine that a data transmission is ready to be sent. A millimeter wave band connection may then be established between head-mounted device 102 or 202, shown in FIGS. 1 and 2, respectively, and computing device 214, shown in FIG. 2. The data transmission may be sent by high-powered transmitting hardware 218, shown in FIG. 2, to high-throughput performance receiving hardware 106 and 206, shown in FIGS. 1 and 2, respectively.

Figure 4:
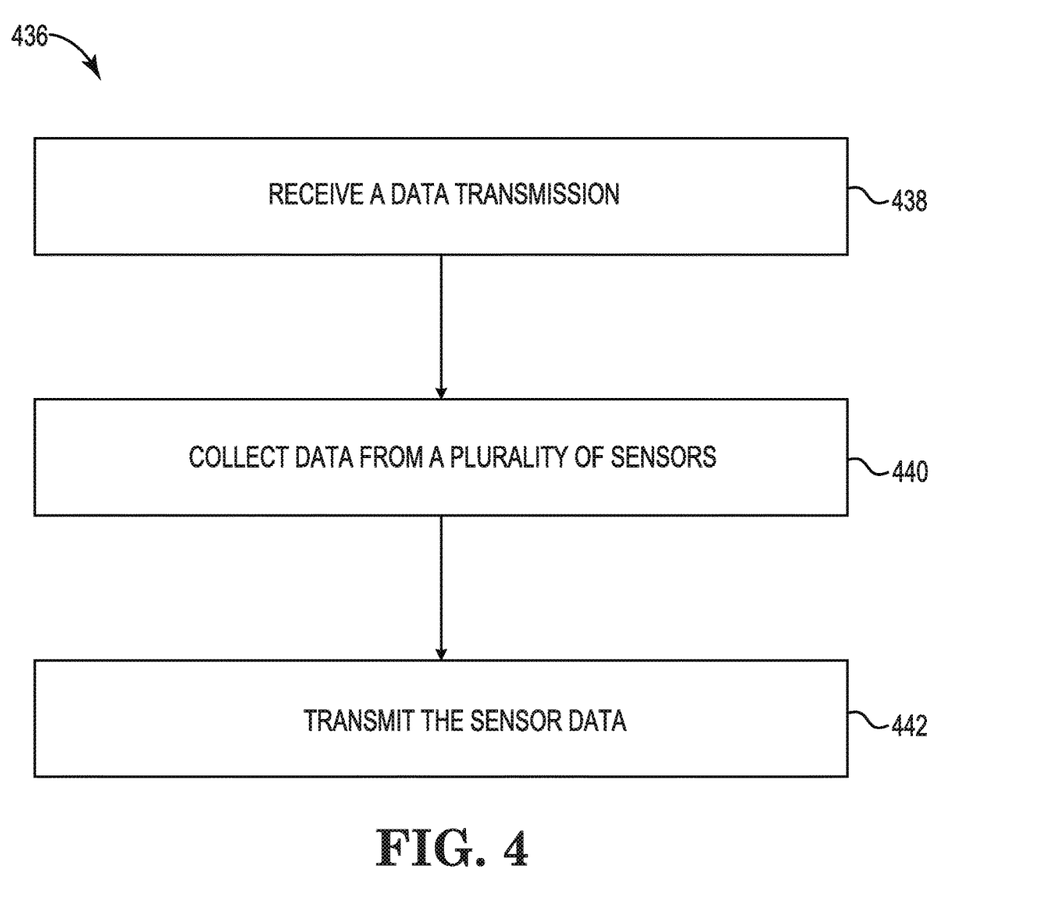
FIG. 4 illustrates an example of a method for a wireless head-mounted device according to the disclosure.

FIG. 4 is an example of a method 436 for a wireless head-mounted device according to the present disclosure. At 438, method 436 may include receiving a data transmission. As previously discussed, the data transmission may include audio and/or visual data. The data transmission may be received by high-throughput performance receiving hardware 106 and 206, shown in FIGS. 1 and 2, respectively. In some examples, the data transmission may be received using a millimeter wave band connection between a computing device, such as computing device 214 shown in FIG. 2, and a head-mounted device, such as head-mounted device 102 and 202, shown in FIGS. 1 and 2, respectively. In some examples, the millimeter wave band connection may correspond to a WiGig connection. The data transmission received at 438 may correspond to receive a data transmission instructions 330, shown in FIG. 3.

At 440, method 436 may include collecting data from a plurality of sensors. The plurality of sensors may correspond to sensors 112 and 212, shown in FIGS. 1 and 2, respectively. As previously discussed, the plurality of sensors may include a variety of types of sensors and may collect multiple kinds of data, including location data and movement data. In some examples, the data may collected from the sensors may be transmitted from the plurality of sensors to the low-powered transmitting hardware. Collecting data from a plurality of sensors at 440 may correspond to collect data from a plurality of data instructions 332, shown in FIG. 3.

At 442, method 436 may include transmitting the data collected from the plurality of sensors. In some examples, the data may be transmitted using low-powered transmitting hardware, such as low-powered transmitting hardware 110 or 210, shown in FIGS. 1 and 2, respectively. In some examples, the data may be transmitted via a Bluetooth connection between head-mounted device 102 or 202, shown in FIGS. 1 and 2, and computing device 214, shown in FIG. 2. Transmitting the sensor data at 442 may correspond to transmit data instructions 334, shown in FIG. 3.

Method 436 may further include separating the received audio and visual data. In some examples, the data may be separated at high-throughput performance receiving hardware 106 or 206, shown in FIGS. 1 and 2. Once separated, the received audio data may be transmitted to a speaker included within an electronic device. In some examples, the electronic device may be a head-mounted device, such as head-mounted device 102 or 202, shown in FIGS. 1 and 2, respectively. The received visual data may be transmitted to a display included within the electronic device. The display may be, for example, a single screen, a plurality of screens, or a projection.

Method 436 may further include combining the data collected from the plurality of sensors at 440 with the audio and visual data. In some examples, the sensor data may be received at computing device 214 by low-powered receiving hardware 222. The received sensor data may then be transmitted to high-powered transmitting hardware 218. High-powered transmitting hardware 218 may combine the received sensor data with audio and visual data into a single transmission. Once combined, high-powered transmitting hardware 218 may transmit the single data transmission from computing device 214, using wireless antenna 216, to head-mounted device 102 or 202, shown in FIGS. 1 and 2, respectively. The data transmission may be received by wireless antenna 104 or 204, coupled to high-throughput performance receiving hardware 106 or 206, shown in FIGS. 1 and 2, respectively.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to any number of such elements and/or features. As used herein, the designator "N", particularly with respect to reference numerals in the drawings, indicates that a number of the particular feature so designated can be included with examples of the present disclosure. The designators can represent the same or different numbers of the particular features.

What is claimed:

1. A wireless head-mounted device, comprising:
high-throughput receiving hardware to receive a transmission including audio, video, or visual data from a corresponding high-throughput transmitting hardware utilizing a millimeter wave band connection included in a computing device;
a plurality of sensors to collect sensor data;
low-powered transmitting hardware to transmit the sensor data to a corresponding low-powered receiving software included in the computing device; and
the computing device to:
suppress the millimeter wave band connection when the low-powered transmitting hardware transmits the sensor data; and
enable the millimeter wave band connection when the high-throughput receiving hardware receives the transmission.

2. The wireless head-mounted device of claim 1, wherein:
the high-throughput receiving hardware receives the transmission at a rate equal to or greater than one gigabit per second; and
the low-powered transmitting hardware transmits the data at a rate equal to or below five megabits per second.

3. The wireless head-mounted device of claim 1, wherein the wireless head-mounted device is a virtual reality (VR) or augmented reality (AR) head-mounted device.

4. The wireless head-mounted device of claim 1, wherein the wireless head-mounted device is without a corresponding high-throughput transmitting hardware.

5. The wireless head-mounted device of claim 1, wherein the wireless head-mounted device is without a corresponding low-powered receiving hardware.

6. The wireless head-mounted device of claim 1, wherein:
the high-throughput hardware comprises a receiving antenna; and
the low-powered transmitting hardware comprises a transmitting antenna.

7. A non-transitory computer readable medium containing instructions that when executed by a processor cause the processor to:
receive, by a high-throughput hardware operating at a millimeter wave band connection, a data transmission;
collect data from a plurality of sensors;
transmit, by a low-powered transmitting hardware, sensor data;

suppress the millimeter wave band connection when the low-powered transmitting hardware transmits the sensor data; and enable the millimeter wave band connection when the high-throughput receiving hardware receives the data transmission.

8. The non-transitory computer-readable medium of claim 7, wherein the instructions to receive a data transmission via a millimeter wave band connection include instructions to receive a data transmission using an IEEE 802.11ad connection.

9. The non-transitory computer-readable medium of claim 7, wherein the instructions to receive a data transmission via a millimeter wave band connection include instructions to receive a data transmission using an IEEE 802.11ay connection.

10. The non-transitory computer readable medium of claim 7, further comprising instructions to:
combine data collected from the plurality of sensors into a single transmission; and
transmit the single transmission via a Bluetooth connection.

11. A method, comprising:
receiving, by a high-powered receiving hardware, a data transmission including audio and visual data from a corresponding high-powered transmitting hardware utilizing a millimeter wave band connection included in a computing device;
collecting data from a plurality of sensors; and
transmitting, by a low-powered transmitting hardware, the data collected from the plurality of sensors;
suppressing the millimeter wave band connection when the low-powered transmitting hardware transmits the data collected from the plurality of sensors; and
enabling the millimeter wave band connection when the high-powered receiving hardware receives the data transmission.

12. The method of claim 11, further comprising:
separating the received audio data and visual data;
transmitting the received audio data to a speaker of an electronic device including the high-powered receiving hardware and the low-powered receiving hardware; and
transmitting the received visual data to a display of the device.

13. The method of claim 11, further comprising combining the data collected from the plurality of sensors into a single transmission transmitted via the low-powered transmitting hardware.

14. The method of claim 11, further comprising combining the data collected from the plurality of sensors with the audio and visual data into a single transmission received by the high-powered receiving hardware.

* * * * *